United States Patent [19]
Batcheller et al.

[11] Patent Number: 4,467,706
[45] Date of Patent: Aug. 28, 1984

[54] ENVIRONMENTAL CONTROL FOR TRACTOR CAB

[75] Inventors: Barry D. Batcheller, West Fargo; William E. Martinson, Fargo, both of N. Dak.

[73] Assignee: Steiger Tractor, Inc., Fargo, N. Dak.

[21] Appl. No.: 356,106

[22] Filed: Mar. 8, 1982

[51] Int. Cl.$^3$ .................... B64D 13/00; B60H 1/00; F24F 7/00
[52] U.S. Cl. .................................... 98/1.5; 98/2.01; 165/16; 236/49
[58] Field of Search ............... 165/16, 43, 12; 236/49; 98/2.01, 1.5; 417/42; 415/26, 30; 364/174, 130, 400, 558; 318/317

[56] References Cited
U.S. PATENT DOCUMENTS

| | | | |
|---|---|---|---|
| 2,311,953 | 2/1943 | McKechnie | 98/2 |
| 3,018,711 | 1/1962 | Welch et al. | 98/2 |
| 3,522,839 | 8/1970 | Wendt et al. | 163/44 |
| 3,776,358 | 12/1973 | Williams | 180/84 |
| 3,868,896 | 3/1975 | Doll et al. | 98/2.11 |
| 4,072,487 | 2/1978 | Irwin | 62/244 |
| 4,120,527 | 10/1978 | Lawrence | 296/28 |
| 4,133,574 | 6/1979 | Martin | 296/28 |
| 4,344,356 | 8/1982 | Casterton et al. | 98/1.5 X |
| 4,375,609 | 3/1983 | Wolf | 318/317 X |

Primary Examiner—William E. Wayner
Assistant Examiner—J. Sollecito
Attorney, Agent, or Firm—Kinney & Lange

[57] ABSTRACT

An environmental control system for an enclosed cab of an off-the-road vehicle such as a tractor includes a pressurization blower for pressurizing the cab to a positive pressure with respect to atmospheric pressure outside the cab, and a recirculation blower for recirculating air within the cab. The system includes a fresh air intake for taking in air from outside the cab, a recirculation air intake for taking in air from within the cab, and outlets through which the air from the blowers enters the cab. An air precleaner and a fresh air filter are provided between the pressurization blower and the fresh air intake. A control circuit automatically provides a speed control signal to the pressurization blower, and a manually selected speed control signal is provided to the recirculation blower. A speed sensor senses the speed of the pressurization blower, which varies for a given speed control signal as a function of air pressure within the cab and the condition of the fresh air filter. The control circuit varies the speed control signal to the pressurization blower as a function of the pressurization blower speed to provide essentially constant air flow from the pressurization blower despite changes in cab pressure and filter condition.

14 Claims, 5 Drawing Figures

ENVIRONMENTAL CONTROL FOR TRACTOR CAB

BACKGROUND OF THE INVENTION

1. Field of the Invention

The present invention relates to off-the-road vehicles and in particular to an environmental control system for an enclosed cab of an off-the-road land vehicle.

2. Description of the Prior Art

In off-the-road vehicles such as agricultural tractors, it has become increasingly common to provide an enclosed cab to protect the operator of the vehicle from dust, noise and extremely hot or cold weather. Heating, ventilating and air condition (HVAC) apparatus has been developed to control the environment within the cab of the tractor. Examples of apparatus of this type are shown in U.S. Pat. Nos. 3,522,839 by Wendt et al; 3,776,358 by Williams; 3,868,896 by Doll et al; 4,072,487 by Irwin; and 4,120,527 by Lawrence.

It has been recognized in the past that it is desirable to pressurize the cab of an agricultural tractor to prevent dust and dirt from entering the cab. If dust and dirt are permitted to enter the cab and the HVAC apparatus, several detrimental effects can occur. First, the presence of airborne dust in the cab can make the farmer uncomfortable. Second, the dust is sucked into the air conditioner coil where it accumulates in the condensed moisture on the evaporator coil. The dust will continue to accumulate and eventually plug the air conditioner coil, thus preventing flow of air. Third, the dust will get into controls, switches, gauges, linkages and the like within the cab. The accumulation of dust can eventually adversely affect the operation of this equipment. In order to prevent dust and dirt from entering the HVAC system, it is typical to provide air filters which filter the fresh air being drawn into the apparatus. As dust and dirt accumulate in the filter, the fresh air filter becomes restricted, and the effectiveness of the HVAC system decreases. As a result, the environment within the cab becomes quite uncomfortable for the farmer. Often the farmer then opens the windows of the cab in an attempt to compensate for the loss of effectiveness of the HVAC SYSTEM. This permits dust to infiltrate the cab, and destroys the controlled environment of the cab.

In the past, it has been typical to use a single blower to draw in fresh air and to recirculate air within the cab. As a result, the blower is drawing air from two different sources: fresh air through a fresh air filter and recirculated air from the cab. As the fresh air filter begins to restrict, which in the case of the dusty and dirty environment occurs rapidly, the amount of air drawn from the fresh air intake drops off drastically, and the bulk of the air movement is recirculated air. This is because when the blower has more than one source of air, it will draw more air from the source which produces the least amount of resistance to air movement. As the fresh air filter restricts, therefore, fresh air intake is reduced, and ultimately cab pressure is lost.

SUMMARY OF THE INVENTION

The present invention is an improved environmental control system for an enclosed cab of an off-the-road land vehicle such as an agricultural tractor. The environmental control system includes a plenum, a fresh air intake through which fresh air enters the plenum, a recirculation air intake through which air from the cab enters the plenum, and an air outlets through which air is exhausted from the plenum into the cab. A pressurization blower draws air from the fresh air intake and forces air through the outlet into the cab to pressurize the cab. A recirculation blower draws air from the recirculation air intake and forces the air out the outlet to provide circulation of air within the cab environment.

Fresh air filter means is provided between the fresh air intake and the pressurization blower for filtering fresh air being drawn into the plenum through the fresh air intake. Air flow through the fresh air filter means becomes restricted, of course, as dust accumulates.

Control means controls the speed of the pressurization blower to maintain an essentially constant output of air flow despite changes in cab pressure and filter condition. This compensates for reduced pressurization blower restriction (i.e. increased blower load) due to a loss of cab pressure if the operator opens the windows or door of the cab. In addition, it compensates for increased pressurization blower restriction (i.e. reduced blower load) due to accumulation of dust in the fresh air filter means.

In preferred embodiments of the present invention, pressurization blower speed sensing means provides signals indicative of the speed of the pressurization blower. For a given speed control signal level, the speed of the pressurization blower is directly related to the blower load. Based upon the sensed blower speed and the given speed control signal level which produced that sensed blower speed, the control means adjusts the speed control signal to maintain desired cab pressurization. When the pressurization blower speed increases above a predetermined limit for a given speed control signal level, the control means alters the speed control signal to increase the pressurization blower speed in order to maintain constant blower output. Similarly, when pressurization blower speed decreases below a predetermined limit for a given speed control signal level, the control means alters the speed control signal to cause the pressurization blower speed to decrease and thus maintain essentially constant air flow output.

When the speed control signal level is at a maximum, and the speed of the pressurization blower is above a predetermined value, this indicates that the fresh air filter means is plugged and that the pressurization blower is unable to deliver enough fresh air to maintain adequate cab pressure. When this occurs, the control means provides an indication to the operator of the vehicle that the fresh air filter means should be cleaned or replaced.

The environmental control system of the present invention also preferably includes both a heater and a cooler located between the blowers and the outlet of the plenum, to either heat or cool the air being supplied to the cab. Temperature select means permits the operator to select a desired temperature setting, and mode select means which permit the vehicle operator to select a heating mode, an air conditioning mode, a ventilation mode, or a defrost mode. Fan speed select means permits the operator to select a desired operating speed for the recirculation blower. (The control means preferably reduces the speed of the pressurization blower when the air conditioning mode is selected and the fan speed select means is at a maximum setting, so as to reduce the amount of fresh air being drawn in and thus increasing the rate of cooling the cab.)

DETAILED DESCRIPTION OF THE PREFERRED EMBODIMENTS

Figure 1:
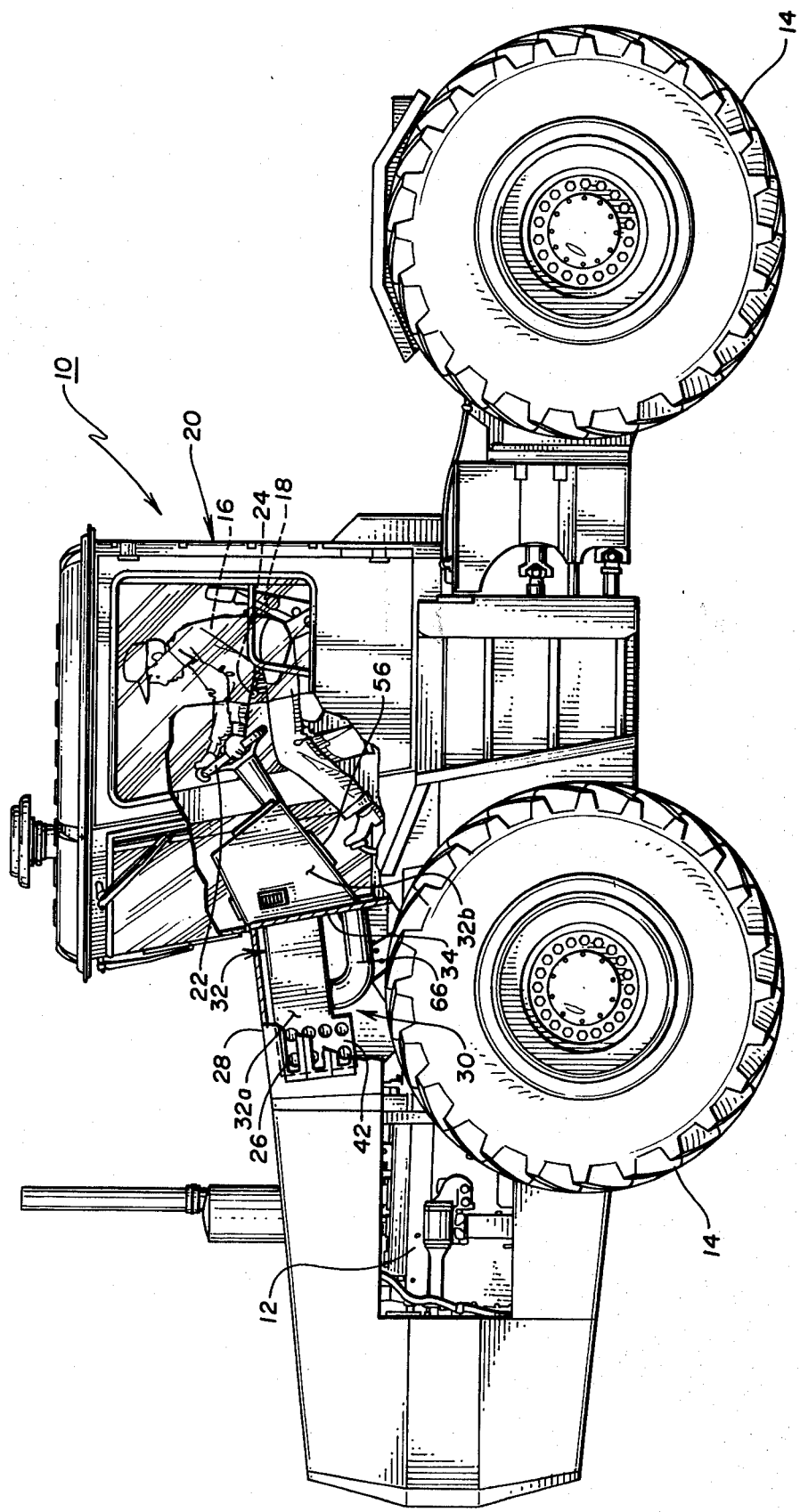
FIG. 1 is a side elevational view of a tractor which utilizes the environmental control system of the present invention, with portions broken away.

FIG. 1 shows agricultural tractor 10, which utilizes the environmental control system of the present invention. Engine 12 provides power to drive wheels 14 of tractor 10. As shown in FIG. 1, tractor 10 is an articulated-type vehicle in which all wheels are driven. It should be recognized, however, that the environmental control system of the present invention is equally applicable to other off-the-road land vehicles, such as heavy construction equipment which may have wheels or crawler treads and which may or may not be articulated.

As illustrated in FIG. 1, farmer 16 sits in seat 18 within cab 20 of tractor 10. All controls necessary to drive tractor 10, including steering wheel 22 and control levers 24 are contained within cab 20. The environmental control system of the present invention provides a controlled, pressurized environment within cab 20. As shown in FIG. 1, fresh air for the environmental control system is drawn in through intake vent 26 on one side of cowl 28.

Figure 2:
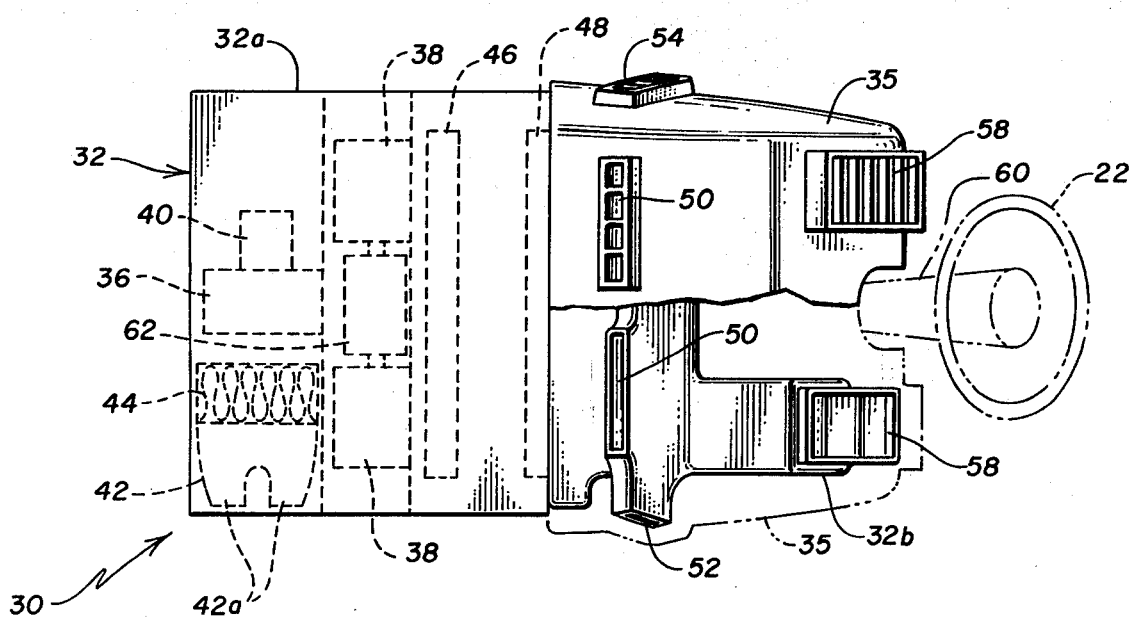
FIGS. 2 and 3 are top and side views illustrating the mechanical portions of the environmental control system of the present invention, with portions broken away.
Figure 3:
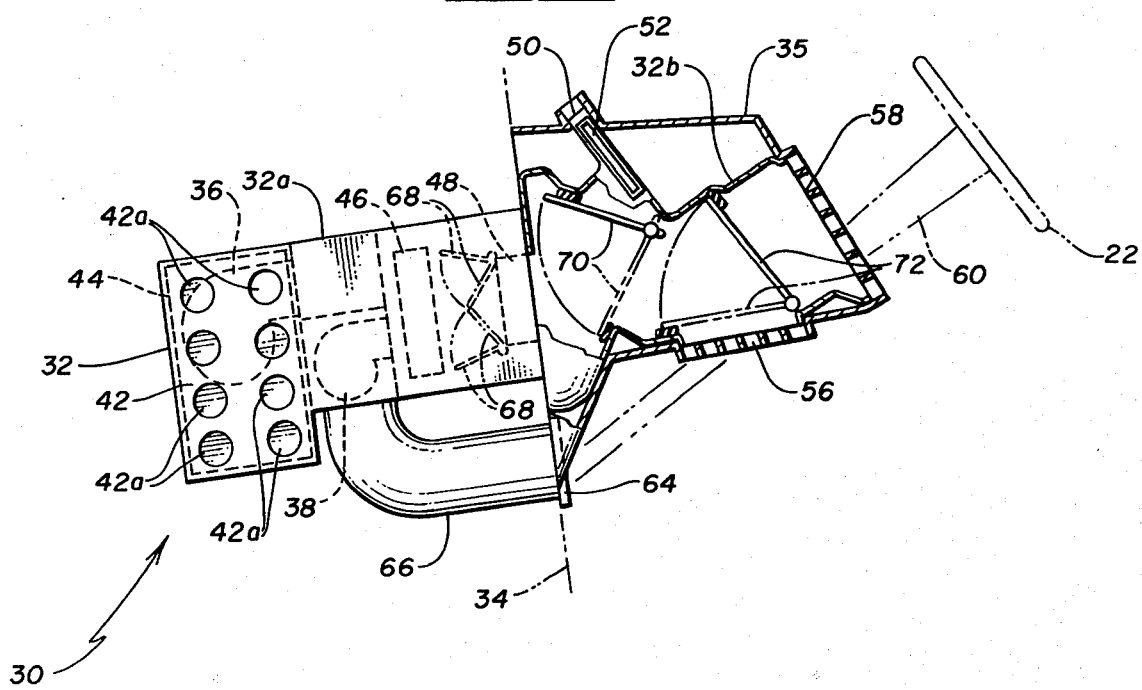

The mechanical portions of the environmental control system of the present invention are housed with HVAC module 30, as illustrated in FIGS. 1-3. Module 30 includes air distribution plenum 32, which has portions 32a and 32b on opposite sides of firewall 34. First portion 32a is located outside of cab 20, and second portion 32b is located within cab 20, inside dash 35. Pressurization blower 36 and recirculation blowers 38 are located within first portion 32a of plenum 32. Pressurization blower 36, which is driven by motor 40, draws fresh air into plenum 32 through fresh air precleaner 42 and fresh air filter 44. The fresh air from pressurization blower 36 is driven past evaporator coil 46 and heater coil 48, and is exhausted into cab 20 through one or more outlets including defrost vents 50, 52 and 54, a pair of heater vents 56, and a pair of dash vents 58. The two heater vents 56 and the two dash vents 58 are positioned on opposite sides of steering column 60. Pressurization blower 36 pressurizes cab 20 to a positive pressure with respect to atmospheric pressure outside of cab 20. This positive pressure significantly reduces the amount of dust and dirt entering cab 20.

Recirculation blowers 38, which are driven by motor 62, draw air from cab 20 through recirculation air filter 64 and duct 66. The air from recirculation blowers 38 is then directed past evaporator coil 46 and heater coil 48 and exhausted into cab 20 through vents 50, 52, 54, 56 and 58.

As illustrated in FIG. 3, the environmental control system also includes blend doors 68, defrost door 70, and left and right louver doors 72. Blend doors 68 control the amount of air flowing through heater coil 48. When blend doors 68 are in their open position, nearly all of the air from pressurization blower 36 and recirculation blower 38 passes through heater coil 48. When blend doors 68 are in their closed position, air flows around rather than through heater coil 48. Blend door actuator 74 (shown in FIG. 4), controls the position of blend doors 68 depending upon the desired amount of heat by moving blend doors 68 to a selected position ranging from the fully open position to the closed position.

Defrost door 70 has three positions. The closed position blocks air flow out of defrost vents 50, 52 and 54. The position of defrost door 70 is controlled by defrost door actuator 76 shown in FIG. 4.

Left and right louver doors 72 have two positions. One position of louver doors 72 blocks air flow out of dash vents 58. The other position of louver door 72 blocks air flow out of heat vents 56. The position of louver doors 72 is controlled by louver door actuators 78 illustrated in FIG. 4.

In the present invention, the use of blower 36 for pressurizing cab 20 and blowers 38 for recirculating air within cab 20 permits independent control of pressurization and recirculation. This provides much greater flexibility in controlling heating, ventilating and air conditioning under a wide range of conditions.

In particular, the independent control of pressurization and recirculation by separate blowers 36 and 38 avoids problems encountered with prior art systems, in which a single blower is used to move both recirculated and fresh air. The air movement requirements for fresh air and recirculated air in cab 20 are opposite in nature. For recirculated air, it is necessary to move a high volume of air at a relatively low restriction. In contrast, the fresh air requirement is for a relatively low amount of air at a high restriction due to the fresh air filter 44. The present invention also avoids the problem encountered in the prior art single blower systems, in which the restriction in the fresh air filter causes the blower to draw a larger percentage of recirculated air due to the lower restriction presented by the recirculated air.

In addition, the present invention permits the addition of fresh air precleaner 42, which increases the operating life of fresh air filter 44. Fresh air precleaner 42 removes a very high percentage of the dust and dirt before it reaches fresh air filter 44. In a preferred embodiment of the present invention, precleaner 42 is a Stratube precleaner manufactured by Donaldson Company. Precleaner 42 includes a plurality of individual precleaner tubes 42a (eight are shown in the particular embodiment illustrated in FIG. 3). Each tube 42a has a vane (not shown) which spins the fresh air entering precleaner 42. As a result, only the fresh air in the center portion of each tube 42a moves on to fresh air filter 44. The dirt on the outer circumference of tubes 42a is drawn away by an aspirating device (not shown) and the air from the aspirating device is expelled together with dirt. The efficiency of precleaner 42 in the system of the present invention is on the order of about ninety-four percent. This greatly enhances the filter life of fresh air filter 44.

The presence of precleaner 42 also allows fresh air filter 44 to be smaller in size than filters used in prior art systems. For example, conventional systems have fresh air filters on the order of six inches wide by forty-eight inches long. In contrast, in a preferred embodiment of the present invention, fresh air filter 44 is about eight inches wide by twelve inches long. This smaller size of fresh air filter 44 provides greater design latitude as far as placement of filter 44 on the vehicle. In addition, the smaller size of filter 44 permits use of higher quality filter material, since less material is being used per filter. This further enhances filter effectiveness and filter life.

A separate blower 36 for fresh air intake and pressurization, as provided by the present invention, is needed in order to use precleaner 42. In prior art systems, in which a single blower is used for both fresh air intake and recirculation, the high restriction provided by the precleaner would cause most of the air being drawn through the blower to come from recirculation, rather than fresh air. The fresh air intake in that case would be insufficient to achieve the desired precleaning action, since precleaner 42 depends in its action upon a minimum air flow velocity.

With the present invention, pressurization blower 36 is controlled to achieve desired fresh air movement, independent of the operation of recirculation blowers 38. As a result, adequate fresh air intake velocity is maintained so that precleaner 42 operates efficiently. The result is a significant increase in life of fresh air filter 44.

Figure 4:
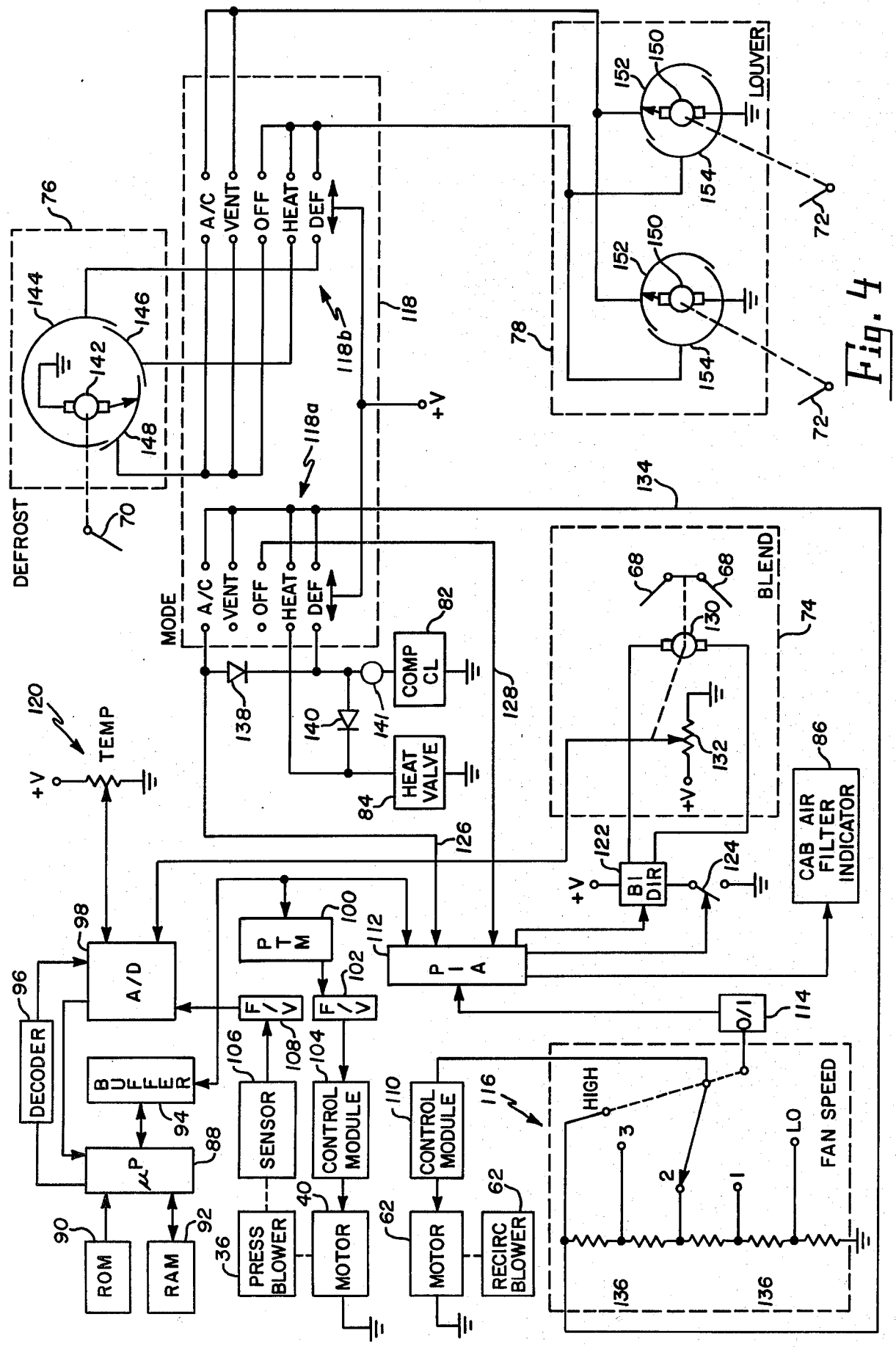
FIG. 4 is an electrical block diagram of the environmental control system of the present invention.

FIG. 4 is an electrical block diagram illustrating a preferred embodiment of the environmental control system of the present invention. In the embodiment shown in FIG. 4, the HVAC control of the present invention controls operation of pressurization blower motor 40, recirculation blower motor 62, blend door actuator 74, defrost door actuator 76, louver door actuator 78, air conditioner compressor clutch 82, heat valve 84, and cab air filter indicator 86.

In the preferred embodiments shown in FIG. 4, the control system includes microprocessor 88, read only memory (ROM) 90, random access memory (RAM) 92, buffer 94, decoder 96, analog-to-digital (A/D) converter 98, programmable timer module (PTM) 100, frequency-to-voltage (F/V) converter 102, control module 104, pressurization blower speed sensor 106, frequency-to-voltage (F/V) converter 108, recirculation blower control module 110, peripheral interface adapter (PIA) 112, opto-isolator (O/I) 114, fan speed select switch 116, mode select switch 118, temperature selector 120, bidirectional switch 122, and switch 124.

Pressurization blower 36 is driven by DC motor 40. Microprocessor 88 controls operation of motor 40 by supplying a digital command signal through buffer 94 to programmable timer module (PTM) 100. PTM 100 outputs a signal having a frequency which is dependent upon the digital command signal. Frequency-to-voltage converter 102 converts the output of PTM 100 to a DC signal having a voltage in the range of between 0 to about 13.8 volts and a current in the range of 0 to about 20 milliamps. Control module 104 amplifies the current to produce a motor control DC signal having the same voltage, but a current in the range of 0 to about 30 amps. This motor control signal determines the speed of DC motor 40.

The speed of pressurization blower 36 is sensed by sensor 106. In a preferred embodiment of the present invention, sensor 106 is a variable reluctance magnetic pickup which senses the vanes of pressurization blower 36 as they pass. The output of sensor 106 is a sinusoidal waveform which is supplied to frequency-to-voltage (F/V, converter 108. The sensor signal is converted by F/V converter 108 to an analog voltage, which is supplied to A/D converter 98. Microprocessor 88, through decoder 96, periodically interrogates A/D converter 98 to sample the value of the analog sensor signal. The control of motor 40, and thus pressurization blower 36, is a closed loop control, in which microprocessor 88 adjusts the digital command signal supplied to PTM 100 based upon the feedback sensor signal from sensor 106 which is supplied through A/D converter 98.

In the preferred embodiment of the present invention, ROM 90 contains a lookup table which indicates the desired speed at which pressurization blower 36 should be turning in relation to a given applied motor control signal supplied by control module 104 to motor 40. When the sensor feedback signal drifts outside a desired range, microprocessor 88 adjusts the digital command signal to PTM 100, and thus the motor control signal voltage to motor 40 to bring the speed of pressurization blower 36 inside a prescribed speed range of the lookup table stored in ROM 90.

Microprocessor 88 monitors the status of fan speed selector switch 116 and mode select switch 118 through PIA 112. When fan speed select switch 116 is in the high speed position (as indicated by a signal from opto-isolator 114 to PIA 112), and mode switch 118 is in an air conditioning (A/C) position (as indicated by a voltage on line 126 to PIA 112, this indicates to microprocessor 88 that the driver is attempting to cool the interior of cab 20 rapidly. Microprocessor 88 then branches to a subroutine in which it reduces the speed of pressurization blower 36 by an appropriate motor control signal supplied by motor 40. This reduction in pressurization blower speed limits the amount of fresh air taken in from outside cab 20, thereby facilitating rapid cooling of the recirculated air. In addition, the reduction in pressurization blower speed reduces noise level in cab 20 while recirculation blower 38 is operating at high speed.

Microprocessor 88 also controls operation of cab air filter indicator 86 through PIA 112. In the preferred embodiments of the present invention, cab air filter indicator 86 is an indicator light on the dash 35 of the tractor which is turned on when fresh air filter 44 has reached its final restriction point, and requires replacement. Microprocessor 88 turns on indicator 86 when the motor control signal supplied to motor 40 is at a maximum value and the feedback signal from sensor 106 indicates that pressurization blower 36 is running at a speed which is higher than a specified speed in the lookup table in ROM 90.

When mode switch 118 is in an OFF position, a voltage is supplied on line 128 to PIA 112. This indicates to microprocessor 88 that the environmental control system is off, and microprocessor 88 turns off pressurization blower motor 40.

Microprocessor 88 also controls blend door actuator 74, based upon an analog input signal received from temperature selector 120. A/D converter 98 converts the analog input signal from temperature selector 120 to a digital value, which is supplied to microprocessor 88. Blend door actuator 74 includes DC motor 130 and potentiometer 132. Motor 130 is a bidirectional DC motor which drives blend doors 68, as well as potentiometer 132. An analog blend door position signal from potentiometer 132 is supplied to A/D converter 98, where it is converted to a digital value and supplied to microprocessor 88. Microprocessor 88 compares the temperature control signal from temperature selector 120 and the blend door position signal from potentiometer 132, and determines whether it is necessary to drive motor 130 in either a clockwise or counterclockwise direction. Based upon this determination, microprocessor 88 supplies signals through buffer 94 and PIA 112 to bidirectional switch 122 and switch 124. Motor 130 is turned on, and rotates both blend doors 68 and potentiometer 132 until the blend door position signal from potentiometer 132 matches the temperature control signal from temperature selector 120. At this point, microprocessor 88 turns off switch 124 and deactuates bidirectional switch 122, thus causing motor 130 to stop. Motor 130 remains deenergized and blend doors 68 remain in the same position until temperature selector 120 is changed, thus creating an unbalance between the temperature control signal and the blend door position signal.

Operation of recirculation blower 38, defrost door actuator 76, louver door actuator 78, air conditioner compressor clutch 82, and heat valve 84 are controlled by fan speed selector switch 116 and mode switch 118, independent of microprocessor 88.

When mode selector switch 118 is in any position other than OFF, voltage V+ is supplied on line 134 to fan speed selector switch 116. In the embodiment shown in FIG. 4, fan speed selector switch 116 is a five-position selector switch having positions labeled "LO", "2", "3", "4" and "HIGH". Resistors 136 are connected between the respective terminals of switch 116 so that selector switch 116 supplies a different voltage level to control module 110 depending on the fan speed selected. Control module 110 supplies a drive signal to DC motor 62, which drives recirculation blower 38. When mode select switch 118 is in the OFF position, the voltage on line 134 is zero, and control module 110 and motor 62 are deenergized.

Mode selector switch 118 is a five-position indexing switch which has a first deck 118a and a second deck 118b. First deck 118a supplies voltage to fan speed selector switch 116 on line 134, controls operation of compressor clutch 82 and heat valve 84, and supplies status signals on lines 126 and 128 to PIA 112. Second deck 118b controls defrost door actuator 76 and louver door actuator 78.

When mode selector switch 118 is in the air conditioning (A/C) position, compressor clutch 82 is supplied voltage from deck 118a through diode 138, and heat valve 84 is supplied voltage through diodes 138 and 140. In addition, a voltage is supplied on line 126 to PIA 112, indicating that the A/C mode has been selected. Voltage V+ is also supplied on line 134 to fan speed selector switch 116.

When the VENT position of switch 118 is selected, deck 118a supplies voltage V+ to line 134.

When the OFF position of switch 118 is selected, deck 118a supplies voltage V+ on line 128 to PIA 112. This signal indicates that the system is off, and microprocessor 88 turns off motor 40.

When mode select switch 118 is in the HEAT position, voltage V+ is supplied on line 134, and is also supplied to heat valve 84 by deck 118a. This permits flow of hot water from tractor engine 12 through heater coil 48.

When mode selector switch 118 is in the defrost (DEF) position, voltage V+ is again applied on line 134, and voltage is supplied to clutch 82 and heat valve 84. In the DEF position, therefore, both the air conditioning and heating systems are operating, so that heat is being provided, while humidity is being reduced by the operation of evaporator coil 46. Diode 138 prevents a signal from being supplied on line 128 when mode switch 118 is in the DEF position. Diode 140 permits heat valve 84 to be turned on when mode switch 118 is in either the A/C or the DEF position, but prevents clutch 82 from being turned on when mode switch 118 is in the HEAT position. Ambient temperature switch 141 prevents operation of compressor clutch 82 at or below freezing.

Second deck 118b of mode selector switch 118 controls louver door actuator 78 and defrost door actuator 76. As shown in FIG. 4, defrost door actuator 76 includes a DC cam actuated rotational motor 142 which operates defrost door 70. Motor 142 has three cams, 144, 146, and 148. Motor 142 is a unidirectional motor which rotates in the same direction as long as there is voltage applied to a cam. When motor 142 reaches the end of travel, it runs off the cam which is energized, and stops.

As shown in FIG. 4, voltage V+ is applied to cam 144 when switch 118 is in the DEF position, is applied to cam 146 when switch 118 is in the HEAT position, and is applied to cam 148 when switch 118 is in the OFF, VENT or A/C position.

Louver door actuator 78 includes a pair of unidirectional DC cam actuated rotational motors 150 for operating louver doors 72. Each motor 150 has a pair of cams 152 and 154. Cams 152 receive voltage when mode selector switch 118 is in either the A/C or VENT position. Cams 154 receive voltage when mode select switch 118 is in the OFF, HEAT, or DEF position. Louver doors 72, therefore, have two predetermined positions, depending upon the state of mode selector switch 118.

An important advantage of the present invention is that microprocessor 88 controls operation of pressurization blower 36 to maintain an essentially constant fresh air volume despite changes in the pressure differential ($\Delta P$) between the inlet and outlet of pressurization blower 36. These changes in $\Delta P$ occur, for example, as fresh air filter 44 becomes clogged, or when a window of cab 20 is open, thus destroying cab pressurization.

The amount of fresh air volume drawn into cab 20 must meet two requirements. First, the fresh air must provide adequate ventilation for the space within cab 20 when a predetermined number (e.g. two) of operators are in cab 20. Second, the amount of fresh air must be adequate to pressurize cab 20 so as to hold dust and dirt out of cab 20. In practice, the pressurization requirement is typically about twice the ventilation requirement, and thus pressurization becomes the important parameter. The pressurization requirement, therefore, establishes the minimum amount of fresh air needed to be drawn into cab 20 at any time.

Ideally, a system should maintain a fresh air intake volume which is at or near the minimum required over the entire operating life of fresh air filter 44. In practice, however, the output of pressurization blower 36 in cubic feet per minute (CFM), varies substantially as a function of blower restriction (i.e. $\Delta P$).

Figure 5A:
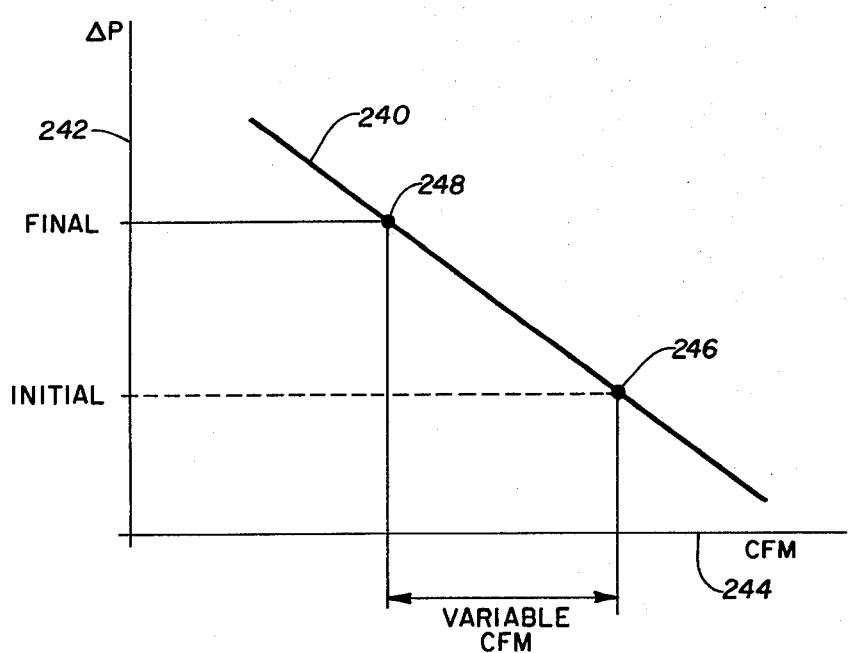
FIGS. 5A and 5B illustrate operation of the pressurization blower of the environmental control system of the present invention without and with the automatic speed control of the pressurization blower.

FIG. 5A is a graph illustrating a pressurization blower operating curve 240. Along axis 242 is plotted pressure differential $\Delta P$, and along axis 244 is plotted cubic feet per minute (CFM) output of pressurization blower 36. As illustrated in FIG. 5A, as $\Delta P$ increases, the CFM output decreases. Conversely, as $\Delta P$ decreases, the CFM output increases.

Two factors which significantly affect $\Delta P$ are the restriction of fresh air filter 44 and the pressure within cab 20. As more and more dust and dirt accumulates in filter 44, the restriction increases, $\Delta P$ increases, and the CFM output decreases. In FIG. 5A, an initial point 246 and a final point 248 are shown. Initial point 246 represents the restriction of filter 44 when it is new. Final point 248 represents the restriction when filter 44 has become so filled with dust and dirt that it is no longer effective.

Ideally, blower curve 240 should be as close to vertical as possible, so that the CFM output does not vary between the initial and final restriction valves of fresh air filter 44. In practice, however, pressurization blower 36 does not exhibit a vertical curve, but rather has a slope like curve 240 shown in FIG. 5A. Tests have shown that CFM output can vary by a factor of three or more between the initial point 246 and the final point 248 of filter 44. This means that the fresh air intake when filter 44 is new would be three times the minimum air intake required to adequately pressurize cab 20. The excess air drawn in when filter 44 is new and has relatively low restriction accelerates clogging of filter 44, and thus reduces the operating life of filter 44. This also reduces A/C cooling effectiveness.

The other factor which can significantly change $\Delta P$ and thus CFM is the air pressure within cab 20. If farmer 16 leaves the cab door open, or opens a window, cab pressurization is lost, and $\Delta P$ is reduced. This results in an increase in CFM, which increases the amount of dirt and dust sucked into fresh air filter 44. If this is allowed to continue, fresh air filter 44 becomes clogged with dust and dirt at a much more rapid rate than when cab pressurization is maintained.

The control system of the present invention, as shown in FIG. 4, controls operation of motor 40 which drives pressurization blower 36 so as to maintain a nearly constant CFM output despite variations in $\Delta P$. The control system takes advantage of the fact that for a given control voltage applied to motor 40, the speed of pressurization blower 36 is a function of blower load. As restriction of filter 44 increases, blower load decreases, and pressurization blower 36 increases in speed for the same given DC control voltage to motor 40. Conversely, if cab pressurization is lost, $\Delta P$ decreases, which increases blower load. As a result, pressurization blower 36 decreases in speed for the same given control voltage to motor 40.

In the system of FIG. 4, microprocessor 88 provides a digital command signal to PTM 100 which results in a motor control signal voltage being applied to motor 40. In addition, microprocessor 88 receives a feedback signal from sensor 106 indicating the speed of pressurization blower 36. Microprocessor 88 compares the blower speed with a value stored in a lookup table in ROM 90 to determine whether the speed of blower 36 is within a predetermined acceptable range for the given motor control signal level applied to motor 40. When the pressurization blower speed increases above a predetermined limit for a given motor control signal level, microprocessor 88 alters the motor control signal to motor 40 to increase the pressurization blower speed in order to maintain essentially constant blower output.

Similarly, if pressurization blower speed decreases below a predetermined limit for a given motor control signal level, microprocessor 88 alters the motor control signal to motor 40 to cause pressurization blower speed to decrease and thus maintain essentially constant air flow output.

Figure 5B:
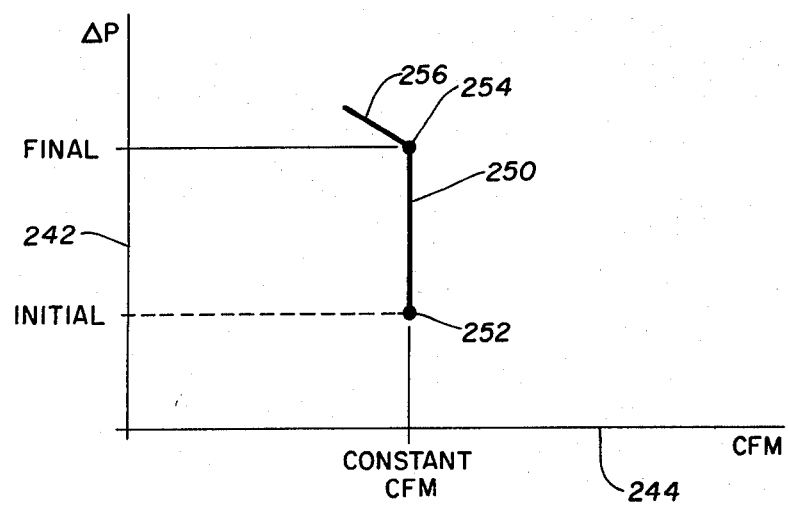

FIG. 5B illustrates the operation of the control system of the present invention, in which pressurization blower motor 40 is controlled as a function of the speed sensor signal from sensor 106. As shown in FIG. 5B, blower curve 250 is essentially vertical between initial point 252 and final point 254 of restriction filter 44. With the control system of the present invention, therefore, an essentially vertical blower curve is achieved by varying the motor control signal to motor 40, even though the pressurization blower 36 has a performance curve similar to curve 240 shown in FIG. 5A when a constant motor control signal is supplied to motor 40. In practice, in order to avoid constant adjustment of the control signal to motor 40 by microprocessor 88, the sensor speed signal is permitted to fluctuate within a predetermined range of the ideal value stored in the lookup table. Thus the CFM output of blower 36 is permitted to fluctuate by a few percent above curve 250. When the fluctuation goes outside of the predetermined range, microprocessor 88 readjusts the speed control signal level to motor 40 to bring the CFM output back within the predetermined range.

As shown in FIG. 5B, as filter restriction ($\Delta P$) continues to increase beyond the final restriction point 254 (i.e. filter 44 has not been changed and dust continues to accumulate in filter 44), the control system is no longer able to maintain the CFM output constant. Motor 40 is receiving the maximum motor control signal level, but filter 44 is so clogged that an inadequate amount of fresh air is withdrawn into plenum 32. This is represented by segment 256 shown in FIG. 5B. In the preferred embodiments of the present invention, when the maximum motor control signal level is applied to motor 40 and the sensor speed signal indicates that pressurization blower 36 is running faster than a predetermined maximum speed, microprocessor 88 actuates cab air filter indicator 86 to warn the farmer 16 that filter 44 is clogged, and should be replaced.

In conclusion, the environmental control system of the present invention, which provides individual control of pressurization blower 36 and recirculation blowers 38, provides improved control of the environment within cab 20 of an off-the-road land vehicle such as an agricultural tractor. The present invention permits the use of an air precleaner 42 which extends the average life of fresh air filter 44. In addition, the present invention permits control of pressurization blower motor 40 so as to provide an essentially constant CFM air flow output of pressurization blower 36, despite changes in the condition of fresh air filter 44 and despite loss of cab pressurization when the operator opens a door or window of cab 20. As a result, improved performance of the environmental control system is achieved, and the average life of fresh air filter 44 is further increased.

Although the present invention has been described with reference to preferred embodiments, workers skilled in the art will recognize that changes may be made in form and detail without departing from the spirit and scope of the invention.

What is claimed is:

1. In an off-the-road land vehicle of the type having prime mover means for providing motive power and ground engaging means driven by the prime mover means, and having an enclosed cab in which a human operator resides when operating the vehicle, an environmental control system for the enclosed cab, the environmental control system comprising:

a plenum having fresh air intake means through which fresh air is drawn into the plenum, recirculation air intake means through which air is drawn from the cab into the plenum, and outlet means through which air is exhausted into the cab;

pressurization blower means between the fresh air intake means and the outlet means for causing air flow from the fresh air intake means to the outlet means;

first motor means for driving the pressurization blower means as a function of a first motor control signal;

recirculation blower means between the recirculation air intake means and the outlet means for causing air flow from the recirculation air intake means to the outlet means;

second motor means for driving the recirculation blower as a function of a second motor control signal;

speed select means for providing a speed select signal;

fresh air filter means for filtering air flowing from the fresh air intake means to the pressurization blower means;

pressurization blower speed sensor means for providing a speed sensor signal indicative of speed of the pressurization blower means, wherein the speed of the pressurization blower means varies as a function of air flow from the pressurization blower means; and control means for producing the first and second control signals to drive independently the pressurization blower means and the recirculation blower means, the first motor control signal being a function of the speed sensor signal to maintain an essentially constant air flow from the pressurization blower means to the outlet means despite changes in cab pressure and condition of the fresh air filter means and the second control signal being a function of the speed select signal.

2. The environmental control system of claim 1 wherein the first motor means is a DC motor, and wherein the first motor control signal is a DC voltage.

3. The environmental control system of claim 2 wherein the pressurization blower speed for a selected DC voltage level of the first motor control signal varies as a function of air flow from the pressurization blower means, and wherein the control means varies the DC voltage level of the first motor control signal as a function of the speed sensor signal to provide essentially constant air flow from the pressurization blower means.

4. The environmental control system of claim 3 wherein the control means comprises:

means for storing for each of a plurality of DC voltage levels of the first motor control signal a corresponding desired pressurization blower speed;

means for comparing an actual speed of the pressurization blower based upon the speed sensor signal with the desired speed corresponding to a then current DC voltage level of the first motor control signal; and means for supplying the first motor control signal with a DC voltage level which is a function of the comparison of the actual speed and the desired speed.

5. The environmental control system of claim 4 and further comprising:

means for providing an indicator signal when the DC voltage level of the first motor control signal has a predetermined value and the actual speed exceeds the desired speed; and indicator means for providing an indication to an operator of the off-the-road vehicle that the fresh air filter means requires cleaning in response to the indicator signal.

6. The environmental control system of claim 1 wherein the control means produces a first motor control signal which reduces the speed of the pressurization blower means when the speed select means has a predetermined setting.

7. The environmental control system of claim 6 wherein the predetermined setting of the speed select means corresponds to a maximum operating speed of the recirculation blower means.

8. The environmental control system of claim 1 and further comprising:

heater means positioned between the pressurization and the recirculation blower means and the outlet means;

cooler means positioned between the pressurization and the recirculation blower means and the outlet means;

temperature select means for providing a temperature select signal;

mode select means for selecting one of a plurality of operating modes; and wherein the control means controls the heater means and the cooler means as a function of the temperature select signal and the mode selected by the mode select means.

9. The environmental control system of claim 8 wherein the plenum includes a portion which extends into the cab, and wherein the outlet means includes a defrost vent for directing air generally upward, a heat vent for directing air generally downward, and a louver vent for directing air generally rearward.

10. The environmental control system of claim 9 and further comprising:

a multi-position defrost door within the plenum for controlling air flow out of the defrost vent;

defrost door actuator means for positioning the defrost door;

multi-position louver door means for controlling air flow out of the louver vent and the heat vent;

louver door actuator means for controlling the position of the louver door; and wherein the control means controls the defrost door actuator and the louver door actuator as a function of the mode selected.

11. The environmental control system of claim 8 and further comprising:

multi-position blend door means for controlling air flow through the heater means;

blend door actuator means for controlling the position of the blend door means; and wherein the control means controls the blend door actuator means as a function of the temperature select signal and the selected.

12. The environmental control system of claim 1 and further comprising:

air precleaner means between the fresh air intake and the fresh air filter means for precleaning fresh air which enters the fresh air filter means.

13. An environmental control system for an enclosed cab in which a human operator resides while operating an off-the-road land vehicle, the environmental control system comprising:
- a plenum having fresh air intake means through which fresh air is drawn into the plenum, recirculation air intake means from which air is drawn from the cab into the plenum, and outlet means through which air is exhausted into the cab;
- pressurization blower means between the fresh air intake means and the outlet means;
- recirculation blower means between the recirculation air intake means and the outlet means;
- fresh air filter means for filtering air flowing from the fresh air intake means to the pressurization blower means;
- pressurization blower speed sensor means for providing a speed sensor signal indicative of speed of the pressurization blower means, wherein the speed of the pressurization blower means varies as a function of cab pressure and condition of the fresh air filter means; and
- control means for independently controlling the pressurization blower means and the recirculation blower means, the control means controlling operation of the pressurization blower means as a function of the speed sensor signal to provide essentially constant air flow from the pressurization blower means despite changes in cab air pressure and condition of the fresh air filter means by reducing the speed of the pressurization blower means in response to a reduction in cab air pressure, and increasing the speed of the pressurization blower means in response to a reduction in air flow through the fresh air filter means caused by accumulation of filtered material in the fresh air filter means.

14. The environmental control system of claim 13 and further comprising:
- air precleaner means between the fresh air intake means and the fresh air filter means for precleaning the air which enters the fresh air filter means.

* * * * *